3,579,510
Patented May 18, 1971

3,579,510
3-(HYDROXY-PHENYL) SUBSTITUTED AMIDINES AND DERIVATIVES THEREOF AS ANTHELMINTIC AGENTS

James W. McFarland, Lyme, Conn., assignor to Pfizer Inc., New York, N.Y.
No Drawing. Filed Aug. 30, 1967, Ser. No. 664,258
Int. Cl. C07c *123/00;* C07d *49/34, 51/36*
U.S. Cl. 260—240
4 Claims

ABSTRACT OF THE DISCLOSURE

The preparation and anthelmintic properties of certain ω-(3-R-O-phenyl)substituted cyclic and acyclic amidines; namely 1,4,5,6 - tetrahydro-2-[2-(3-R-O-phenyl)ethyl]pyrimidines, 1,4,5,6 - tetrahydro-2-[2-(3-R-O-phenyl)vinyl] pyrimidines and the corresponding 2-imidazolines; and N-methyl - N - substituted 3-(3-R-O-phenyl)propionamidines and the corresponding acrylamidines wherein R-O- is hydroxy or a group convertible to hydroxy, is described.

BACKGROUND OF THE INVENTION

This invention relates to novel 3-hydroxyphenyl substituted cyclic and acyclic amidines and certain derivatives thereof and their non-toxic acid addition salts which are useful as anthelmintic agents. More particularly, it relates to N-methyl-N-substituted 3-(3-hydroxyphenyl)propionamidines and the corresponding acrylamidines, and to 1,4,5,6-tetrahydropyrimidines and 2-imidazolines having at the 2-position a 3-hydroxyphenethyl or a 2-(3-hydroxyphenyl) vinyl group which are of value for the control of helminthiasis. Also included are those derivatives in which the hydroxy group is replaced by a group readily convertible to an hydroxy group.

Helminthiasis, the infection of the animal body, and particularly the gastrointestinal tract, by various species of parasitic worms, is perhaps the economically most significant disease in the world today. Although the economic consequences of this disease have led to extensive research for new and more effective anthelmintics, the countermeasures developed to date for its treatment and prevention have not been entirely satisfactory. The present invention has as object the provision of a group of cyclic and non-cyclic amidines which exhibit an unexpectedly broad spectrum of anthelmintic activity and are therefore especially effective in the control of helminthiasis.

SUMMARY OF THE INVENTION

According to the present invention it has now been unexpectedly found that cyclic and non-cyclic amidines having the formulae:

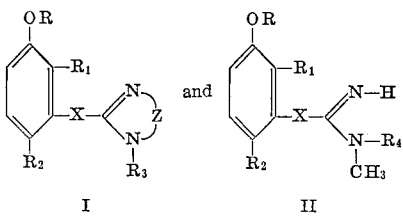

and the non-toxic acid addition salts thereof wherein R is selected from the group consisting of hydrogen, methyl, ethyl, benzyl and lower alkanoyl; each of $R_1$ and $R_2$ is selected from the group consisting of hydrogen, methyl, chloro, bromo and iodo, with the proviso that at least one of $R_1$ and $R_2$ is hydrogen; Z is selected from the group consisting of ethylene and trimethylene; $R_3$ is selected from the group consisting of hydrogen and methyl; $R_4$ is selected from the group consisting of methyl, ethyl, methoxy, methylamino and allyl; and X is selected from the group consisting of ethylene and trans-vinylene, have an extraordinarily broad spectrum of anthelmintic activity and are surprisingly effective agents for the control, e.g. therapeutic and propylactic, of helminthiasis in animals, including humans, when administered orally or parenterally, and possess favorable therapeutic ratios.

Of the lower alkanoyl substituted 3-hydroxyphenyl compounds having the above formulae, those having up to four carbon atoms in the alkanoyl substituent are preferred since the necessary starting materials are more easily obtained and the resulting 3-lower alkanoyloxy phenyl compounds are more readily converted to the corresponding 3-hydroxyphenyl compounds than are those having more than four carbon atoms.

By "non-toxic" acid addition salts is meant those salts which are non-toxic at the dosages administered. The non-toxic acid addition salts of the above mentioned bases which may be employed are the water soluble and water insoluble salts such as the hydrochloride, hydrobromide, phosphate, nitrate, sulfate, acetate, hexafluorophosphate, citrate, gluconate, benzoate, propionate, butyrate, sulfosalicylate, maleate, laurate, malate, fumarate, succinate, oxalate, tartrate, amsonate, (4,4'-diaminostilbene-2, 2'-disulfonate), pamoate (1,1'-methylene-bis-2-hydroxy-3-naphthoate), stearate, 3-hydroxy-2-naphthoate, p-toluene-sulfonate, suramin salt and resin adsorbates. The hexafluorophosphate salts are especially valuable as a means for isolating the novel amidine products of this invention from aqueous solutions of the free bases or of water soluble acid addition salts. They precipitate out rapidly and quantitatively or almost quantitatively as crystalline products and are easily purified as by washing with water. They thus serve as a means for recovering and purifying these novel amidines. The free base is, in turn, easily recovered from the hexafluorophosphate salt by neutralization.

These agents are active against both the mature and immature forms of helminths of the suborders Strongylata, Oxyurata, Trichurata and Ascaridata and cestodes, especially those of the order Cyclophyllidea. They are effective against the families Strongyloides, Trichostrongyloidea and Oxyuroidea. Additionally, some of these agents are active against Hymenolepsis nana. They are especially effective against the gastrointestinal parasites of ruminants (e.g., sheep, cattle, goats) and of non-ruminants such as dogs, cats, horses and swine.

DETAILED DESCRIPTION OF THE INVENTION

The novel products of this invention are prepared by known methods, such as reaction of the appropriate amine tosylate, e.g. dimethylamine tosylate or alkylenediamine tosylate with the desired nitriles such as 3-(3-hydroxyphenyl)propionitrile, 3-(3-hydroxyphenyl)acrylonitrile to give the tosylate salt of the corresponding amidine. Alternatively, the imino-ether hydrochlorides corresponding to the above mentioned nitriles can be reacted with the appropriate amine, e.g., dimethylamine or alkylenediamine, to give the hydrochloride of the corresponding amidine. In still another method, compounds of Formula I wherein X is ethylene are prepared by reaction of the appropriate propionitrile, such as 3-(3-hydroxyphenyl)propionitrile, with the proper alkylenediamine in the presence of hydrogen sulfide or phosphorous pentasulfide.

The requisite 3-R-O-phenyl substituted acrylonitriles are prepared by a Knoevenagel type condensation of the appropriate aldehyde, e.g. 3-hydroxybenzaldehyde, with cyanoacetic acid in the presence of an appropriate catalyst. As catalysts, nitrogen bases, e.g. ammonia, primary and secondary amines, pyridine, piperidine, triethanolamine, can be used. The favored catalyst system is ammonium acetate-pyridine. The reaction is conducted in a reaction-inert solvent system such as in toluene, benzene, xylene, preferably with continuous removal of by-product water. Additionally, the nitrogenous base can be used as solvent. The reaction is advantageously run at a temperature of from about 80° C. to the reflux temperature of the solvent and preferably at a temperature sufficient to permit simultaneous removal of the by-product water by azeotropic distillation.

The 3-substituted propionitriles are conveniently prepared from the corresponding 3-substituted acrylonitriles by catalytic hydrogenation over a noble metal catalyst, e.g. palladium, platinum, rhenium, rhodium, iridium, osmium. Palladium-on-carbon is especially effective in affording a smooth reaction and satisfactory yields. As solvent system a suitable reaction-inert solvent should be used. Methanol and other alcohols, aqueous tetrahydrofuran and dioxane, are satisfactory solvents. The system can be neutral, basic or acidic. A slightly basic system is generally favored since it appears to accelerate the rate of reaction. Bases of particular value are the alkali metal hydroxides, especially sodium and potassium hydroxide, and the quaternary ammonium hydroxides, e.g.

$$R_1R_2R_3R_4-NOH$$

wherein $R_1$, $R_2$, $R_3$ and $R_4$ are alkyl; $R_3$ and $R_4$ are benzyl and alkyl substituted benzyl, such as trimethylbenzylammonium hydroxide, (p-t-butyl)benzyltrimethylammonium hydroxide. The amount of base used is not critical but in general a molar ratio of from about 0.05 to about 0.23 moles of base per mole of ω-substituted acrylonitrile is satisfactory. The pressure and temperature appear not to be critical factors. Pressures of up to about 500 p.s.i. afford good yields. Reaction temperatures up to 100° C. can be used. The reaction should be stopped when the theoretical amount of hydrogen is taken up.

Substituted acrylonitriles and propionitriles are converted by known methods to imido esters by addition of alcohols under the influence of hydrogen chloride under anhydrous conditions. The usual conditions comprise passing dry hydrogen chloride into an equimolar mixture of the ω-substituted acrylonitrile and an alcohol in ether or dioxane solution. The operative temperature range is from about 0° C. to about 35° C. and preferably from about 0° C. to 15° C. The imido ester hydrochloride is then ammonolyzed to the desired amidine by reaction with an alcoholic solution of the appropriate amine. Alternatively, the imido ester, free base form, is reacted with an alcoholic solution of the amine hydrochloride or other acid addition salt. Suitable alcohols are methanol, ethanol, butanol, propanol and 2-propanol. Other solvents such as dioxane, tetrahydrofuran can also be used. An excess of the amine can be used as solvent, if desired. For large scale reactions, that is, reactions larger than laboratory scale, the use of a solvent of the type mentioned above is preferred. The ammonolysis is carried out at a temperature of from about −5° C. to about 50° C. and preferably at from about −5° C. to about 30° C. until formation of the production is complete or essentially complete. The amidine hydrochloride is recovered, e.g. removal of the solvent, and the residue recrystallized from a suitable solvent system.

The novel compounds described herein wherein X is vinylene are also prepared by reaction of the appropriate acrylamide derivative, e.g. 3-(3-hydroxyphenyl)acrylamide, with 1,3-propanesultone (Ried and Schmidt, Ann. 676, 114 (1964) to produce an imino ether in which the newly introduced radical is 3-propylsulfonic acid, e.g. 3-[1′-imino-3-(3-hydroxyphenyl)allyloxy]propane sulfonic acid. The thus produced imino ether is then reacted with the appropriate diamine, e.g. ethylenediamine, trimethylenediamine, or the N-monomethyl derivatives thereof to give the desired cyclic amidine, or with the appropriate N-methylamine, e.g. N-methyl-N-ethylamine to give the corresponding acylic amidine. The compounds thus produced have the trans configuration.

Still another method, indeed the favored method, for making the novel cyclic amidines (Formula I) described herein wherein X is vinylene, comprises the direct condensation of the appropriate 3-R-O-benzaldehyde with a 2-methyl substituted imidazoline or tetrahydropyrimidine under conditions which result in the effective removal of by-product water as is described in Belgian specification 681,413. The preferred method for making such compounds is that described in U.S. application Ser. No. 643,391, filed June 5, 1967, now abandoned, which employs a formate ester as water scavenger in the direct condensation process.

Those compounds for Formulae I and II wherein R is other than hydrogen, and particularly those compounds wherein R is lower alkanoyl, can of course, be produced from the appropriate 3-hydroxy derivative (R=H) by known methods. For example, acylation of the proper 3-hydroxy compound produces the corresponding alkanoyl compound.

The tosylate and hydrochloride salts prepared as described above can be readily converted to the free base simply by neutralization of the acid portion of the salt by aqueous sodium or potassium hydroxide and the water insoluble free base recovered by mechanical means or by solvent extraction with a suitable immiscible solvent such as ethyl acetate. The free base, isolated by removal of the solvent, can, if desired, be purified by recrystallization from a suitable solvent system or by vacuum distillation. Alternatively, the free bases are obtained by neutralization of an acid salt with sodium methoxide in methanol and recovery of the base by known methods. Other acid addition salts can be readily prepared simply by dissolving the free base in a suitable solvent, e.g. acetone, a lower aliphatic alcohol (ethanol, isopropanol) containing the desired acid, or to which the desired acid is subsequently added. The salts are recovered by filtration, precipitation with a non-solvent, by evaporation of the solvent or, in the case of aqueous solutions, by lyophilization. In this manner the sulphate, nitrate, phosphate, acetate, propionate, butyrate, citrate, gluconate, benzoate, pamorate, amsonate, the tartrate 3-hydroxy-2-naphthoate and the sulphosalicylate and other salts can be prepared.

The tosylate salts of the amidines produced as described above can be converted to the corresponding hydrochloride salts by percolating a methanolic solution of the tosylate through the chloride form of an anion exchange resin. Other acid addition salts can also be prepared by this method.

Resin adsorbates of the amidines of this invention are conveniently prepared by slurrying an aqueous solution of a water soluble salt of the cyclic amidine of choice with a suspension of the sodium form of a cation exchange resin for a sufficient period to permit adsorption of the compound by the resin. Suitable resins are the strong sulfonic acid type cation resins, such as Dowex 50, Amberlite CG–120, Amberlite IR–120, Zeo-Karb 225 (available from the Dow Chemical Co., Rhom & Haas, and the Permutit Co., Ltd. respectively), all of which are sulfonated styrene divinyl benzene polymers cross-linked to varying degrees.

As noted above, these products are effective to a significant degree in controlling, that is, in eliminating and preventing, helminthiasis in animals, including man, by both the oral and parenteral routes of administration. The terms "controlling" and "control" as used herein are meant to include the treatment of helminthiasis in animals, including man, suffering therefrom an the prevention (prophylaxis) of helminthiasis in animals, including man. Subcutaneous and intramuscular injections are the preferred methods of parenteral injection for domestic animals for several reasons; simplicity, convenience and the compounds appear less toxic. Vehicles suitable for parenteral injection may be either aqueous such as water, isotonic, saline, isotonic dextrose, Ringer's solution, or non-aqueous such as fatty oils of vegetable origin (cottonseed, peanut oil, corn, sesame) and other non-aqueous vehicles which will not interfere with the therapeutic efficiency of the preparation and are non-toxic in the volume or proportion used (glycerol, propylene glycol, sorbitol). Additionally, compositions suitable for extemporaneous preparation of solutions prior to administration may advantageously be made. Such compositions may include liquid diluents for example, propylene glycol, diethyl carbonate, glycerol, sorbitol, etc.; buffering agents, as well as local anesthetics and inorganic salts to afford desirable pharmacological properties. Administration of these anthelmintic agents in combination with hyaluronidase avoids local irritation and increases the rate of absorption of the drug. Hyaluronidase levels of at least about 150 (U.S.P.) units are very effective in this respect although higher or lower levels can, of course, be used.

the feed is employed. However, higher proportions can be satisfactorily employed depending upon the platability of the product to the animal. Additionally, these compounds can be used in micronized form especially when used in emulsions or suspensions by either the oral or parenteral route of administration.

The effectiveness of 1-methyl-1,4,5,6-tetrahydro-2-[2-(3-hydroxyphenyl)vinyl]pyrimidine hydrochloride against *Hymenolepsis nana*, *Nematospiroides dubius* and *Syphacia obvelate* (adult) is demonstrated by directly administering the compound orally to mice infected with all these species of helminths. The compound is administered in a single dose and the MED (minimum effective dose which achieves at least a 90% reduction in thew orm burden as compared to untreated infected controls) determined— Table I. The therapeutic index (T.I.) is defined as the ratio of the maximum tolerated dose (MTD) to the minimum effective concentration (MEC).

TABLE I

| Single dose, mg./kg. | Average percent reduction (4 mice/group) | | | | Toxicity | No. of trials |
|---|---|---|---|---|---|---|
| | H. nana | N. dub. | S. obv. (A)[1] | S. obv. (I)[1] | | |
| 500 | 100 | 100 | 100 | 90 | 2/4 | 1 |
| 250 | 100 | 100 | 100 | 50 | 0/4 | 1 |
| 125 | 99.5 | 97 | 100 | 90 | 0/8 | 2 |
| 62 | 99.7 | 48.7 | 100 | 76.7 | 0/12 | 3 |
| 31 | 48 | 31.5 | 90 | 50 | 0/8 | 2 |
| MED | 62 | 125 | 62 | >500 | | |
| T.I | 8 | 2 | 8 | <1 | | |
| MTD | | | | | 250 | |

[1] A = adult and I = immature pinworms.

When administered parenterally for therapeutic purposes the anthelmintic agents described herein or their non-toxic acid addition salts are administered in a dosage equivalent to from about 5 mg. to about 250 mg. of the free base/kg. of body weight.

When administered by the oral route, the preferred route, especially in man, for administering the novel products of this invention, the compounds are given in dosages equivalent to form about 0.5 mg. to about 150 mg. of free base/kg. of body weight. For therapeutic use a dosage equivalent to about 1 mg. to 100 mg. of free base/kg. of body weight is recommended. Oral administration to animals other than man can readily be accomplished by a number of methods including mixing with the feed, unit dosage formulations such as capsules, tablets, liquid mixtures and solution including drench solutions. Solutions having concentrations ranging from about 3% up to the limit of solubility of the salt in water are satisfactory for drench solutions. More dilute solutions can, however, be supplied for drinking purposes. Alternatively, wettable powder containing the active ingredient may be added to the animal's drinking water.

For prophylactic use, 0.5 to 50 mg. (calculated as free base) per kg. of body weight daily is administered. This is the preferred range. Higher dosages can, of course, be used but are not desirable from an economic standpoint. above methods of administration are suitable although administration in the animal's food, water, or mineral mixture is more convenient.

Boluses and capsules are also used for the therapeutic treatment of animals. For animals weighing from 30 to 1000 pounds the usual dose, calculated as free base, ranges from 0.1 to 45 grams. Boluses of suitable sizes containing these materials can be prepared by conventional methods.

Dry mineral mixtures containing the products of this invention at levels of from 0.001 to about 10% of the active ingredient mixed with salt (sodium chloride) and other minerals can be fed the animals on an ad libitum basis by adjusting the proportion of active ingredient in the mixture to the average daily consumption per animal so as to provide the proper daily dose as specified above. If prepared feed supplements are employed, the material can be administered in admixture with the feed. Again, a concentration range of about 0.001 to 10% of the drug in The therapeutic efficacy of 1-methyl-1,4,5,6-tetrahydro-2-[2-(3-hydroxyphenyl)vinyl]pyrimidine hydrochloride is further demonstrated by administering the drug to mice challenge with a triple infection of *H. nana*, *N. dubius* and *S. obvelata* (adult and immature). The mice are artificially inoculated with *H. nana* and *N. dubius*, 15 and 20 worms, respectively. The *S. obvelata* infection is naturally ocurring and averages 40 adult and 40 immature worms per mouse. The mice are then fed rations containing various levels of the drug beginning on the 14th day, post infection. The medicated feed is provided until the 21st and 28th days.

The prophylactic efficacy is established by feeding the medicated rations to the mice beginning with the day of infection up to the 7th and 14th days, post infection. Pertinent data is presented in Table II. The MEC percent is the minimum percent concentration of the drug in the feed which will bring about at least a 90% reduction in the worm burden compared to untreated infected controls.

TABLE II

| Post-infection, days medicated | MEC, percent | | | |
|---|---|---|---|---|
| | H. nana | N. dub. | S. obv. (A)[1] | S. obv. (I)[1] |
| 0-7 (prophylactic) | >0.06 | >0.06 | <0.06 | <0.06 |
| 0-14 (prophylactic) | 0.12 | 0.5 | <0.12 | <0.12 |
| 14-21 (therapeutic) | 0.25 | 0.5 | 0.12 | <0.12 |
| 14-28 (therapeutic) | 0.25 | >0.25 | 0.06 | <0.06 |
| MED | 62 | 125 | 62 | >500 |

[1] A equals adult and I equals immature pinworms.

Thus, the therapeutic and prophylactic regimens have proved effective in eliminating and preventing the triple infection. The MEC values against each specie of helminth correlate with the direct dose MED values (Table I) with the exception of immature *S. obvelata*. This stage is readily eliminated by the drug when administered in the feed but is difficult to eliminate by direct dose therapy. Both the direct dose and feed incorporation data indicate that the maximum effectiveness of this drug in the mouse is in the ileo-cecal junction.

In dogs 1-methyl-1,4,5,6-tetrahydro-2-[2-(3-hydroxyphenyl)vinyl]pyrimidine hydrochloride has shown activity against hook-worm, ascarid and tapeworm. Additionally, activity against whipworm (*Trichuris vulpis*) has also been observed. The activity pattern observed in the dog is consistent with the ileo-cecal anthelmintic activity zone found in the mouse.

Data on these studies of this drug in dogs infected with *Toxocara canis*, *Trichuris vulpis* and *Ancylostoma duodenale* (ascarids, whipworm and hookworm, respectively) is shown in Table III.

into a Paar hydrogenation apparatus, flushed twice with nitrogen and then three times with hydrogen. Hydrogenation is conducted in the normal manner until the theoretical amount (0.5 mole) of hydrogen is absorbed. The catalyst is removed by filtration, and the filtrate concentrated to a mixture of an oil and aqueous sodium hydrox-

TABLE III

| Test | Dose, mg./kg. | Dog | Ova/gram—Feces | | | Percent red | | | Post-treatment worm counts | | | Tape |
|---|---|---|---|---|---|---|---|---|---|---|---|---|
| | | | Hook. | Trich. | Toxo. | Hook. | Trich. | Toxo. | Hook. | Trich. | Toxo. | |
| 1 | 50 | 1 | | 1,815 | 555 | | 100 | 96 | | 0 | 0 | 0 |
|   | 50 | [1]2 | | 105 | | | 100 | | | 0 | | 2 |
|   | 50 | [1]3 | 2,115 | 4,760 | | 91 | 92 | | 19 | 37 | | 0 |
| Average | | | 2,115 | 2,240 | 555 | 91 | 97 | 96 | 19 | 12.3 | 0 | 0.67 |
| Control | | 1 | 2,530 | 140 | | | | | 89 | 24 | | 0 |
| Do | | 2 | | | 720 | | | | | | 4 | 14 |
| Do | | 3 | 775 | | | | | | 13 | | | 0 |
| 2 | 25 | [1]1 | 665 | 945 | | 68 | 97 | | 4 | 1 | | 0 |
|   | 25 | 2 | 3,245 | 150 | | 98 | 100 | | 15 | 0 | | 0 |
|   | 25 | [1]3 | | 105 | | | 100 | | | 0 | | 1 |
| Average | | | 2,453 | 400 | | 83 | 99 | | 9.5 | 0.33 | | 0.33 |
| Control | | 1 | | 3,040 | | | | | | 72 | | 0 |
| Do | | 2 | 475 | 4,500 | | | | | 44 | 76 | | 14 |
| Do | | 3 | 400 | 2,300 | | | | | 54 | 303 | | 0 |
| 3 | 25 | 1 | 2,785 | | | 96.9 | | | 2 | | | 0 |
|   | 25 | [1]2 | 8,090 | 2,655 | | 61.2 | 91 | | 26 | 0 | | 0 |
|   | 25 | 3 | Tapeworm ova only | | | | | | | | | 2 |
| Control | | 1 | 60 | 105 | | | | | 2 | 13 | | 27 |
| Do | | 2 | 4,230 | | | | | | 67 | | | 4 |
| Average | | | 1,393 | 2,017 | 720 | | | | 46.5 | 97.2 | 4 | [2]7.4 |

[1] Emetic.
[2] Average value includes all 8 control dogs whether or not infected with tapeworms.

NOTE.—All controls, 8 dogs.

The following examples are given for purposes of illustration and not by way of limitation. (The dosages used in the examples are calculated as the free base).

EXAMPLE I 3-(3-hydroxyphenyl)acrylonitrile

A solution of 134.3 g. (1.10 moles) of 3-hydroxybenzaldehyde, 85.0 g. (1.00 mole) cyanoacetic acid, 3 g. of ammonium acetate, 110 ml. of pyridine, and 200 ml. of toluene is heated under reflux in an apparatus which includes a Dean-Stark moisture trap. The reaction mixture is then allowed to cool and the solvents evaporated under reduced pressure. The less volatile residue is fractionally distilled through a column packed with porcelain saddles to yield the product.

In like manner the following compounds are prepared from the appropriate 3-R-O-benzaldehyde compound. For the sake of convenience all R values corresponding to a given set of $R_1$ and $R_2$ values are presented in a single column.

ide. Water is added to this mixture and the resulting aqueous solution extracted with ether. The ether extract is dried, filtered and evaporated under reduced pressure to a pale yellow oil which is fractionally distilled through a column packed with porcelain saddles to give the product. The remaining acrylonitriles of Example I are similarly hydrogenated to their corresponding propionitriles.

EXAMPLE III

Ethyl 3-(3-hydroxyphenyl)propionimidate hydrochloride

A solution of 173.7 g. (1.18 moles) of 3-(3-hydroxyphenyl)propionitrile in 60.0 g. (1.3 moles) dry ethanol and 360 ml. of dry ether is saturated with hydrogen chloride while the temperature is maintained at below 10° C. After three hours the yellow orange solution is saturated and then stirred at ambient temperature overnight under a dry nitrogen atmosphere. During this time a solid cake is produced in the reaction flask, which is broken up with the addition of fresh ether. The product is collected, washed thoroughly with ether and dried at room temperature for three hours, to give the product. The product is stored under nitrogen in the refrigerator.

Repetition of this procedure but replacing ethanol by methanol, n-propanol or n-butanol produced the corresponding alkyl 3-(3-H-O-phenyl)propionimidate hydrochlorides.

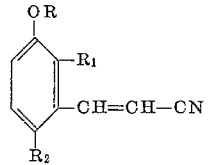

| R | | | | | | | $R_1$ | $R_2$ |
|---|---|---|---|---|---|---|---|---|
| H | $CH_3$ | $C_2H_5$ | $C_7H_7$ | CHO | $COCH_3$ | $COC_2H_5$ | $COC_3H_7$ | H | H |
| H | $CH_3$ | $C_2H_5$ | $C_7H_7$ | CHO | $COCH_3$ | | $COC_2H_7$ | $CH_3$ | H |
| H | $CH_3$ | $C_2H_5$ | $C_7H_7$ | CHO | $COCH_3$ | | $COC_3H_7$ | Cl | H |
| H | $CH_3$ | $C_2H_5$ | $C_7H_7$ | | $COCH_3$ | | | Br | H |
| H | $CH_3$ | $C_2H_5$ | $C_7H_7$ | | $COCH_3$ | | | I | H |
| H | $CH_3$ | $C_2H_5$ | $C_7H_7$ | CHO | $COCH_3$ | $COC_2H_5$ | | H | $CH_3$ |
| H | $CH_3$ | $C_2H_5$ | $C_7H_7$ | | $COCH_3$ | $COC_2H_5$ | | H | Cl |
| H | $CH_3$ | $C_2H_5$ | $C_7H_7$ | CHO | $COCH_3$ | | | H | Br |
| H | $CH_3$ | $C_2H_5$ | $C_7H_7$ | | $COCH_3$ | $COC_2H_5$ | | H | I |

EXAMPLE II 3-(3-hydroxyphenyl)propionitrile

A pressure bottle is charged with 72.6 g. (0.05 mole) of 3-(3-hydroxyphenyl)acrylonitrile, 50 ml. of 1 N sodium hydroxide, 300 ml. of methanol, and 10 g. of 5% palladium-on-carbon catalyst. The pressure bottle is fitted

EXAMPLE IV

Following the procedure of Example III the remaining propionitriles of Example II are converted to their alkyl propionimidate hydrochlorides.

EXAMPLE V

Methyl-3(3-hydroxyphenyl)acrylamidate hydrochloride

Into a solution of 153.9 g. (1.06 moles) of 3-(3-hydroxyphenyl)-acrylonitrile and 33.8 g. (1.06 moles) of methanol and 240 ml. of anhydrous ether is introduced, with stirring, 42.2 g. (1.16 moles) of hydrogen chloride over a period of two hours. The temperature is maintained at 0° C. The solution is refrigerated overnight, then the solid product filtered off and washed with ether.

By means of this procedure the corresponding ethyl, n-propyl and n-butyl imido esters are prepared from the proper alcohol.

EXAMPLE VI

The remaining acrylonitrile compounds of Example I are converted to their alkyl acrylimidate hydrochlorides by the procedure of Example V.

EXAMPLE VII

3-(3-hydroxyphenyl)acrylic acid

A solution of 1.0 mole of 3-hydroxybenzaldehyde, 1.0 mole of malonic acid, 3.0 g. of ammonium acetate, 250 ml. of toluene, and 120 ml. of pyridine is heated under reflux for 48 hours in an apparatus which includes a Dean-Stark moisture trap. The solution is then evaporated under reduced pressure, and the residue triturated under ether. The crystalline product is filtered then recrystallized from benzene/hexane to afford pure 3-(3-hydroxyphenyl)acrylic acid.

EXAMPLE VIII

3-(3-hydroxyphenyl)acrylamide

A stirred solution of 0.5 mole of 3-(3-hydroxyphenyl)-acrylic acid, and 200 ml. of methylene chloride is treated drop-wise with 63.5 g. (42.5 ml., 0.5 mole) of oxalyl chloride. The resulting mixture is allowed to stand at room temperature for two days, then evaporated under reduced pressure. The oily residue is stirred into 600 ml. of ice-chilled concentrated ammonium hydroxide, and the mixture is allowed to stand for an hour before it is filtered. The crystalline product is taken up in 500 ml. of benzene and the mixture heated under reflux in an apparatus which includes a Dean-Stark moisture trap. When water is no longer evolved the hot solution is cooled, and the resulting precipitate filtered. The crystalline residue is recrystallized from acetone/hexane to afford pure 3-(3-hydroxyphenyl)acrylamide. By means of this procedure and that of Example VII, the following acrylamides are prepared:

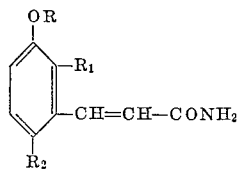

| R | $R_1$ | $R_2$ | R | $R_1$ | $R_2$ |
|---|---|---|---|---|---|
| H | Cl | H | $C_2H_5$ | Br | H |
| H | H | Cl | $C_2H_5$ | H | $CH_3$ |
| H | Br | H | $C_2H_5$ | H | Cl |
| H | H | Br | $C_7H_7$ | H | H |
| H | I | H | $C_7H_7$ | H | $CH_3$ |
| H | H | I | $C_7H_7$ | Cl | H |
| H | $CH_3$ | H | $C_7H_7$ | H | $CH_3$ |
| H | H | $CH_3$ | $C_7H_7$ | H | Cl |
| $CH_3$ | H | H | $C_7H_7$ | H | Br |
| $CH_3$ | Cl | H | $C_7H_7$ | I | H |
| $CH_3$ | Br | H | $C_7H_7$ | H | I |
| $CH_3$ | I | I | $COCH_3$ | H | H |
| $CH_3$ | $CH_3$ | H | $COC_2H_7$ | H | H |
| $CH_3$ | H | Cl | $COCH_3$ | Cl | H |
| $CH_3$ | H | $CH_3$ | $COCH_3$ | $CH_3$ | H |
| $C_2H_5$ | H | H | $COCH_3$ | H | $CH_3$ |
| $C_2H_5$ | Cl | H | $COCH_3$ | H | Cl |
| $C_2H_5$ | $CH_3$ | H | $COCH_3$ | H | Br |
| $C_2H_5$ | H | Br | | | |

EXAMPLE IX

3-[(3-hydroxyphenyl)acrylimidoyloxy]propanesulfonic acid

A solution of 16.3 g. (0.1 mole) of 3-(3-hydroxyphenyl)acrylamide and 12.2 g. (0.1 mole) of 1,3-propanesultone is heated at 130–140° C. with occasional stirring by a glass rod. After a short time the solution solidifies. Heating is continued for 30 minutes, and the mixture then allowed to cool to room temperature. The solid mass is ground in a mortar then triturated under acetone. The crude product is used in subsequent preparations without further purification.

Repetition of this procedure but using the acrylamides of Example VIII produces the corresponding acrylimidoyloxy propanesulfonic acids.

EXAMPLE X

1-methyl-1,4,5,6-tetrahydro-2-[2-(3-hydroxyphenyl)-vinyl]pyrimidine dihydrogen hexafluorophosphate A solution of 23.8 g. (0.0834 mole) of 3-[(3-hydroxyphenyl)acrylimidoyloxy]propanesulfonic acid, 8.8 g. (0.1 mole) of N-methyl-1,3-propanediamine, and 100 ml. of methanol is heated under reflux for 5 hours. After cooling to room temperature the solution is evaporated under reduced pressure to furnish a dark oil which is taken up in 200 ml. of water. The aqueous solution is washed with ethylacetate and then stirred under 100 ml. of ether. The ether phase is then separated and the aqueous phase extracted three times with 50 ml. portions of ether. Aqueous phase is then treated with 22 ml. of 65% hexafluorophosphoric acid and thoroughly stirred. The crystalline product precipitates and is recrystallized from ethanol (including an activated carbon treatment) to afford the desired product.

In like manner, the following compounds are prepared as their hexafluorophosphate salts:

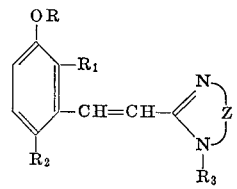

| R | $R_1$ | $R_2$ | $R_3$ | $Z^1$ |
|---|---|---|---|---|
| H | H | H | H | Tri. |
| H | H | H | H | Eth. |
| H | H | H | $CH_3$ | Eth. |
| H | Cl | H | $CH_3$ | Tri. |
| H | Br | H | $CH_3$ | Tri. |
| $CH_3$ | H | Cl | $CH_3$ | Tri. |
| $CH_3$ | H | Br | $CH_3$ | Tri. |
| H | H | I | H | Eth. |
| H | $CH_3$ | H | $CH_3$ | Tri. |
| H | $CH_3$ | H | H | Tri. |
| $C_2H_5$ | H | $CH_3$ | $CH_3$ | Tri. |
| H | H | $CH_3$ | H | Eth. |
| $C_7H_7$ | Br | H | $CH_3$ | Eth. |

[1] Tri.=trimethylene; Eth.=ethylene.

EXAMPLE XI

1-methyl-1,4,5,6-tetrahydro-2-[2-(3-hydroxyphenyl)-vinyl]pyrimidine hydrochloride To a solution of 1,2-dimethyl-1,4,5,6-tetrahydropyrimidine (13.4 g., 0.12 mole) in methyl formate (12.0 ml., 0.20 mole) there is added dropwise with stirring 3-hydroxybenzaldehyde (12.0 g., 0.1 mole). When solution is complete, the mixture is stirred at 43° C. for 18 hours then stripped to a gummy residue under reduced pressure. The gum is taken up in isopropanol (100 ml.) and concentrated hydrochloric acid (11 ml.) added. The mixture is stirred the stripped to dryness under reduced pressure and the gummy residue then triturated with acetone.

The salt (17.8 g.) is filtered off and recrystallized; first from methanol-isopropanol (1:1), then from ethanol; M.P. 207°–208° C.

Analysis.—Calcd. for $C_{13}H_{16}N_2O \cdot HCl$ (percent): C, 61.77; H, 6.78; N, 11.08. Found (percent): C, 61.62; H, 7.03; N, 11.09.

It exhibits maxima (aqueous solution) in the ultraviolet region of the spectrum at 231 and 274 m$\mu$; $\epsilon$=12,700 and 20,100, respectively.

In like manner the following cyclic amidines are prepared from the appropriate reactants.

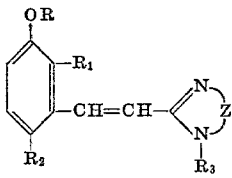

| R | R₁ | R₂ | R₃ | Z¹ |
|---|---|---|---|---|
| H | H | H | H | Tri. |
| H | H | H | H | Eth. |
| H | H | H | CH₃ | Tri. |
| H | H | H | CH₃ | Eth. |
| H | CH₃ | H | H | Eth. |
| H | CH₃ | H | CH₃ | Eth. |
| H | Cl | H | CH₃ | Tri. |
| H | Cl | H | CH₃ | Eth. |
| H | Cl | H | H | Tri. |
| H | Br | H | CH₃ | Tri. |
| H | I | H | CH₃ | Tri. |
| H | H | CH₃ | CH₃ | Tri. |
| H | H | CH₃ | CH₃ | Eth. |
| H | H | Cl | H | Tri. |
| H | H | Br | H | Tri. |
| H | H | Br | CH₃ | Eth. |
| CH₃ | I | H | CH₃ | Tri. |
| C₂H₅ | CH₃ | H | H | Eth. |
| CH₃ | H | Cl | CH₃ | Tri. |
| C₂H₅ | H | Cl | CH₃ | Eth. |
| C₇H₇ | CH₃ | H | CH₃ | Tri. |
| C₇H₇ | H | CH₃ | H | Eth. |
| C₇H₇ | H | Cl | H | Eth. |
| COCH₃ | Cl | H | CH₃ | Tri. |
| COCH₃ | CH₃ | H | CH₃ | Tri. |
| COCH₃ | H | Br | H | Tri. |
| H | H | I | CH₃ | Tri. |
| H | H | CH₃ | CH₃ | Tri. |
| H | H | Cl | CH₃ | Eth. |
| H | I | H | CH₃ | Tri. |
| CH₃ | H | H | H | Tri. |
| CH₃ | H | H | H | Eth. |
| CH₃ | H | H | CH₃ | Tri. |
| CH₃ | H | H | CH₃ | Eth. |
| CH₃ | CH₃ | H | H | Tri. |
| CH₃ | CH₃ | H | CH₃ | Tri. |
| CH₃ | H | CH₃ | H | Tri. |
| CH₃ | H | CH₃ | CH₃ | Tri. |
| CH₃ | Cl | H | CH₃ | Tri. |
| CH₃ | Cl | H | CH₃ | Eth. |
| C₂H₅ | H | H | CH₃ | Tri. |
| C₂H₅ | H | H | H | Eth. |
| C₂H₅ | Cl | H | CH₃ | Tri. |
| C₂H₅ | Br | H | CH₃ | Tri. |
| C₂H₅ | H | Br | CH₃ | Tri. |
| C₂H₅ | H | CH₃ | H | Eth. |
| C₂H₅ | H | CH₃ | CH₃ | Eth. |
| C₇H₇ | H | H | H | Tri. |
| C₇H₇ | H | H | H | Tri. |
| C₇H₇ | Cl | H | CH₃ | Eth. |
| C₇H₇ | I | H | CH₃ | Eth. |
| C₇H₇ | H | I | CH₃ | Tri. |
| COCH₃ | H | H | CH₃ | Tri. |
| COC₃H₇ | H | H | CH₃ | Tri. |
| COCH₃ | CH₃ | H | H | Eth. |
| COCH₃ | H | CH₃ | CH₃ | Tri. |
| COCH₃ | H | Cl | H | Tri. |
| C₇H₇ | H | Br | CH₃ | Tri. |

¹ Tri. equals trimethylene; Eth. equals ethylene.

EXAMPLE XII

N,N-dimethyl-3-(2-methyl-3-hydroxyphenyl)acrylamidine hexafluorophosphate

Ice chilled 2 N anhydrous dimethylamine in dry methanol (50 ml. 0.1 mole) is treated portion-wise with 15.0 g. (0.05 mole) of 3[(2-methyl-3-hydroxyphenyl)acrylimidoyloxy]propanesulfonic acid. The resulting solution is allowed to warm to room temperature, and to stand for two days. The volatiles are then evaporated under reduced pressure, the residue taken up in 100 ml. of water, and the resulting solution washed with ethyl acetate. The aqueous phase is stirred under 100 ml. of diethyl ether, and the ether phase separated. The aqueous phase is then treated with 25 ml. of 65% hexafluorophosphoric acid. The salt which precipitates is separated and recrystallized from ethenol to provide the desired product.

Repetition of the above procedure but using the appropriate reactants provides the following compounds as their hexafluorophosphate salts.

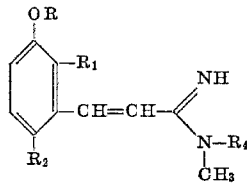

| R | R₁ | R₂ | R₄ |
|---|---|---|---|
| H | H | H | CH₃ |
| H | H | H | C₂H₅ |
| H | H | H | Allyl. |
| H | H | H | HNCH₃ |
| H | H | H | OCH₃ |
| H | Cl | H | CH₃ |
| H | Br | H | C₂H₅ |
| H | CH₃ | H | OCH₃ |
| H | CH₃ | H | Allyl. |
| H | H | Br | CH₃ |
| H | H | Br | Allyl. |
| H | H | Br | OCH₃ |
| C₂H₅ | H | Cl | CH₃ |
| C₇H₇ | CH₃ | H | Allyl. |
| C₇H₇ | H | CH₃ | HNCH₃ |
| C₇H₇ | H | Cl | C₂H₅ |
| C₇H₇ | H | I | CH₃ |
| COC₃H₇ | H | H | OCH₃ |
| H | Cl | H | HNCH₃ |
| H | Br | H | Allyl. |
| H | I | H | CH₃ |
| H | I | H | OCH₃ |
| H | H | Cl | CH₃ |
| H | H | Cl | HNCH₃ |
| H | H | Cl | Allyl. |
| H | H | CH₃ | CH₃ |
| H | H | CH₃ | Allyl. |
| H | H | CH₃ | OCH₃ |
| H | H | I | HNCH₃ |
| H | H | I | Allyl. |
| H | H | I | C₂H₅ |
| CH₃ | H | H | CH₃ |
| C₂H₅ | H | H | CH₃ |
| C₇H₇ | H | H | CH₃ |
| COCH₃ | H | H | CH₃ |
| COC₃H₇ | H | H | CH₃ |
| CH₃ | CH₃ | H | CH₃ |
| CH₃ | H | H | HNCH₃ |
| CH₃ | H | H | OCH₃ |
| CH₃ | H | H | Allyl. |
| C₂H₅ | H | H | C₂H₅ |
| CH₃ | Cl | H | CH₃ |
| CH₃ | H | Cl | CH₃ |
| CH₃ | CH₃ | H | Allyl. |
| C₇H₇ | Cl | H | OCH₃ |
| C₇H₇ | H | Br | C₂H₅ |
| C₇H₇ | H | I | CH₃ |
| COCH₃ | Cl | H | HNCH₃ |
| COCH₃ | CH₃ | H | CH₃ |
| COCH₃ | H | CH₃ | Allyl. |
| CH₃ | I | H | C₂H₅ |
| CH₃ | Br | H | CH₃ |
| CH₃ | H | CH₃ | CH₃ |
| C₂H₅ | Cl | H | C₂H₅ |
| C₂H₅ | CH₃ | H | Allyl. |
| C₂H₅ | Br | H | CH₃ |
| C₂H₅ | Br | H | CH₃ |
| C₂H₅ | H | CH₃ | OCH₃ |

EXAMPLE XIII

N,N-dimethyl-3-(3-hydroxyphenyl)propionamidine

This procedure illustrates the reaction of an imido ester hydrochloride with an amine in free base form to produce an amidine.

Ethyl 3-(3-hydroxyphenyl)propionimidate hydrochloride (20.2 g.; 0.10 mole) is placed in a pressure bottle and cooled in an ice bath. Dimethylamine (2.5 N in methanol; 125 ml.; 0.30 mole) is added and the mixture stirred until solution is complete. The reaction mixture is hold at room temperature for 48 hours then evaporated to a crystalline mass. Two recrystallizations from acetone: methanol or from methanol:ethylacetate give the pure product.

EXAMPLE XIV

N-ethyl-N-methyl-3-(3-hydroxyphenyl)acrylamidine hydrochloride

This procedure exemplifies the conversion of the free base form of an imido ester to an amidine by reaction with an amine salt.

To a stirred, ice-cooled mixture of saturated sodium carbonate (50 ml.), water (50 ml.) and ether (200 ml.), is added methyl 3-(3-hydroxyphenyl) acrylimidate hydrochloride (20.2 g.). After 15 minutes stirring the ether phase is separated, dried and evaporated under reduced pressure to give methyl 3-(3-hydroxyphenyl)acrylimidate as an oil.

A solution of N-methylethyl amine hydrochloride (5.0 g.; 0.05 mole) in methanol (25 ml.) is cooled to 0° C. and an ice-cooled solution of methyl 3-(3-hydroxyphenyl) acrylimidate (8.3 g.; 0.05 mole) in methanol (25 ml.) added. The mixture is allowed to warm to room temperature and then to stand overnight. The solvent is evaporated under reduced pressure to furnish an oil which is crystallized from hot acetone. Recrystallization from methanol/acetone provides the pure product.

EXAMPLE XV

The acyclic amidines listed below are prepared as their hydrochloride salts from the appropriate reactants following the procedures of Examples XIII and XIV.

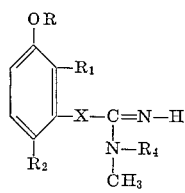

| R | R₁ | R₂ | X | R₄ |
|---|----|----|----|----|
| H | H | H | —CH₂CH₂— | CH₃ |
| H | H | H | Same as above | C₂H₅ |
| H | H | H | do | HNCH₃ |
| H | H | H | do | OCH₃ |
| H | H | H | do | Allyl |
| H | Cl | H | do | CH₃ |
| H | Cl | H | do | HNCH₃ |
| H | Cl | H | do | Allyl |
| H | Br | H | do | OCH₃ |
| H | Br | H | do | CH₃ |
| H | I | H | do | CH₃ |
| H | I | H | do | Allyl |
| H | CH₃ | H | do | CH₃ |
| H | CH₃ | H | do | C₂H₅ |
| H | CH₃ | H | do | Allyl |
| H | CH₃ | H | do | NHCH₃ |
| H | H | H | do | CH₃ |
| H | H | H | do | C₂H₅ |
| H | H | H | do | HNCH₃ |
| H | H | H | do | OCH₃ |
| H | H | H | do | Allyl |
| H | H | CH₃ | do | CH₃ |
| H | H | Cl | do | CH₃ |
| H | H | Br | do | C₂H₅ |
| H | H | Br | do | OCH₃ |
| H | H | CH₃ | do | HNCH₃ |
| H | H | CH₃ | do | Allyl |
| H | H | Cl | do | Allyl |
| H | CH₃ | H | do | CH₃ |
| H | Cl | H | do | OCH₃ |
| H | I | H | do | C₂H₅ |
| H | H | H | do | CH₃ |
| H | CH₃ | H | do | CH₃ |
| H | H | CH₃ | do | CH₃ |
| H | H | Cl | do | CH₃ |
| H | H | Br | do | HNCH₃ |
| H | H | Cl | do | OCH₃ |
| H | H | Cl | do | OCH₃ |
| H | H | Cl | do | HNCH₃ |
| H | CH₃ | H | do | CH₃ |
| H | Cl | H | do | CH₃ |
| H | H | CH₃ | do | CH₃ |
| H | Cl | H | do | HNCH₃ |
| H | H | H | do | Allyl |
| H | H | H | do | CH₃ |
| H | I | H | —CH=CH— | C₂H₅ |
| H | Cl | H | Same as above | OCH₃ |
| H | Br | H | do | HNCH₃ |
| H | I | H | do | HNCH₃ |
| H | H | CH₃ | do | C₂H₅ |
| H | H | Cl | do | C₂H₅ |
| H | Br | H | do | C₂H₅ |
| H | Cl | H | do | OCH₃ |
| H | H | I | do | HNCH₃ |
| H | H | H | do | CH₃ |
| H | H | H | do | Allyl |
| H | Cl | H | do | CH₃ |
| H | H | Cl | do | CH₃ |
| H | H | I | do | HNCH₃ |
| H | Br | H | do | CH₃ |
| H | H | I | do | OCH₃ |
| H | H | I | do | C₂H₅ |
| H | H | I | do | Allyl |
| H | CH₃ | H | do | CH₃ |
| H | H | CH₃ | H | do | CH₃ |

| R | R₁ | R₂ | X | R₄ |
|---|----|----|----|----|
| H | H | Cl | do | HNCH₃ |
| H | H | H | do | CH₃ |
| H | H | H | do | HNCH₃ |
| H | CH₃ | H | do | OCH₃ |
| H | H | Br | do | Allyl |
| H | H | H | do | CH₃ |
| CH₃ | H | H | —CH₂CH₂— | CH₃ |
| CH₃ | CH₃ | H | Same as above | CH₃ |
| CH₃ | Cl | H | do | CH₃ |
| CH₃ | H | CH₃ | do | CH₃ |
| CH₃ | H | Cl | do | CH₃ |
| CH₃ | Br | H | do | CH₃ |
| CH₃ | H | I | do | CH₃ |
| CH₃ | H | H | do | C₂H₅ |
| CH₃ | CH₃ | H | do | C₂H₅ |
| CH₃ | H | CH₃ | do | C₃H₅ |
| CH₃ | Cl | H | do | C₂H₅ |
| CH₃ | I | H | do | C₂H₅ |
| CH₃ | H | Br | do | C₂H₅ |
| CH₃ | H | H | do | OCH₃ |
| CH₃ | CH₃ | H | do | OCH₃ |
| CH₃ | Cl | H | do | OCH₃ |
| CH₃ | H | Br | do | OCH₃ |
| CH₃ | H | H | do | HNCH₃ |
| CH₃ | CH₃ | H | do | HNCH₃ |
| CH₃ | H | CH₃ | do | HNCH₃ |
| CH₃ | Br | H | do | HNCH₃ |
| CH₃ | I | H | do | HNCH₃ |
| CH₃ | H | H | do | Allyl |
| CH₃ | CH₃ | H | do | Allyl |
| CH₃ | H | Cl | do | Allyl |
| CH₃ | Cl | H | do | Allyl |
| C₂H₅ | H | H | do | CH₃ |
| C₂H₅ | CH₃ | H | do | CH₃ |
| C₂H₅ | Cl | H | do | CH₃ |
| C₂H₅ | H | Cl | do | CH₃ |
| C₂H₅ | H | CH₃ | do | CH₃ |
| C₂H₅ | H | H | do | C₃H₅ |
| C₂H₅ | CH₃ | H | do | C₂H₅ |
| C₂H₅ | H | Cl | do | C₂H₅ |
| C₂H₅ | H | I | do | C₃H₅ |
| C₂H₅ | H | H | do | OCH₃ |
| C₂H₅ | Br | H | do | OCH₃ |
| C₂H₅ | H | Br | do | OCH₃ |
| C₂H₅ | H | H | do | HNCH₃ |
| C₂H₅ | CH₃ | H | do | HNCH₃ |
| C₂H₅ | Br | H | do | HNCH₃ |
| C₂H₅ | H | Cl | do | HNCH₃ |
| C₂H₅ | H | H | do | Allyl |
| C₂H₅ | I | H | do | Allyl |
| C₂H₅ | H | I | do | Allyl |
| C₇H₇ | H | H | do | CH₃ |
| C₇H₇ | Cl | H | do | CH₃ |
| C₇H₇ | H | H | do | OCH₃ |
| C₇H₇ | Cl | H | do | OCH₃ |
| C₇H₇ | H | CH₃ | do | OCH₃ |
| C₇H₇ | H | H | do | HNCH₃ |
| C₇H₇ | CH₃ | H | do | HNCH₃ |
| C₇H₇ | H | CH₃ | do | HNCH₃ |
| C₇H₇ | Cl | H | do | HNCH₃ |
| C₇H₇ | H | H | do | Allyl |
| C₇H₇ | H | I | do | Allyl |
| C₇H₇ | H | H | do | Allyl |
| COCH₃ | I | H | do | CH₃ |
| COC₃H₇ | H | H | do | CH₃ |
| CHO | H | H | do | CH₃ |
| COCH₃ | H | H | do | OCH₃ |
| COCH₃ | CH₃ | H | do | OCH₃ |
| COCH₃ | Cl | H | do | OCH₃ |
| COCH₃ | H | Br | do | OCH₃ |
| COC₂H₇ | H | CH₃ | do | HNCH₃ |
| COC₃H₇ | H | H | do | HNCH₃ |
| COC₃H₇ | Cl | H | do | HNCH₃ |
| COCH₃ | H | H | do | Allyl |
| COCH₃ | H | CH₃ | do | Allyl |
| COCH₃ | CH₃ | H | do | Allyl |
| COCH₃ | Cl | H | do | Allyl |
| CH₃ | H | H | —CH=CH— | CH₃ |
| CH₃ | H | CH₃ | Same as above | CH₃ |
| CH₃ | H | Cl | do | CH₃ |
| CH₃ | H | H | do | C₂H₅ |
| CH₃ | Cl | H | do | C₂H₅ |
| CH₃ | H | I | do | C₂H₅ |
| CH₃ | H | H | do | OCH₃ |
| CH₃ | CH₃ | H | do | OCH₃ |
| CH₃ | Cl | H | do | OCH₃ |
| CH₃ | H | Cl | do | HNCH₃ |
| CH₃ | H | Br | do | HNCH₃ |
| CH₃ | CH₃ | H | do | HNCH₃ |
| CH₃ | H | H | do | Allyl |
| CH₃ | CH₃ | H | do | Allyl |
| C₂H₅ | H | Cl | do | Allyl |
| CH₇ | H | H | do | CH₃ |
| COCH₃ | H | H | do | CH₃ |
| COCH₃ | H | H | do | C₂H₅ |
| C₇₂H₅ | H | CH₃ | do | OCH₃ |
| C₇H₇ | CH₃ | H | do | Allyl |
| C₇H₇ | Cl | H | do | CH₃ |
| COCH₃ | H | H | do | HNCH₃ |
| COC₂H₅ | H | H | do | CH₃ |
| COC₃H₇ | CH₃ | H | do | Allyl |
| C₇H₇ | H | H | do | OCH₃ |
| C₂H₅ | Br | H | do | HNCH₃ |
| C₂H₅ | Cl | H | do | C₂H₅ |
| C₂H₅ | Cl | H | do | Allyl |
| CH₅ | CH₃ | H | do | CH₂ |

TABLE—Continued

| R | R₁ | R₂ | X | R₄ |
|---|---|---|---|---|
| C₂H₅ | H | CH₃ | ....do.......... | CH₃ |
| C₇H₇ | CH₃ | H | ....do.......... | CH₃ |
| CH₃ | Cl | H | ....do.......... | CH₃ |
| CH₃ | I | H | ....do.......... | CH₃ |
| CH₃ | Cl | H | ....do.......... | Allyl. |
| C₇H₇ | H | Br | ....do.......... | CH₃ |

EXAMPLE XVI

Hydrogen sulfide is bubbled through a mixture of 3-(2-chloro-3-hydroxyphenyl)propionitrile (0.5 mole) and N-methyltrimethylenediamine (0.5 mole) until 1.7 g. is taken up. The mixture is then stirred and heated at 70°–80° C. for two hours. Ammonia is evolved. The temperature is then raised to 95 C. for six hours and the product recovered by distillation in vacuo.

Hydrogen sulfide may be replaced by phosphorous pentasulfide, the latter being used at a level of 0.015 mole per mole of reactants.

By means of the above procedure ($H_2S$) the following compounds are prepared from appropriate reactants.

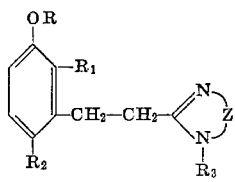

| R | R₁ | R₂ | R₃ | Z¹ |
|---|---|---|---|---|
| H | H | H | H | Tri. |
| H | H | H | CH₃ | Tri. |
| H | H | H | H | Eth. |
| H | H | H | CH₃ | Eth. |
| H | CH₃ | H | CH₃ | Tri. |
| H | CH₃ | H | H | Tri. |
| H | CH₃ | H | CH₃ | Eth. |
| H | H | CH₃ | CH₃ | Tri. |
| CH₃ | H | H | CH₃ | Tri. |
| CH₃ | CH₃ | H | CH₃ | Tri. |
| CH₃ | H | Cl | H | Eth. |
| CH₃ | H | I | H | Tri. |
| C₂H₅ | H | H | CH₃ | Tri. |
| C₂H₅ | Cl | H | H | Eth. |
| C₂H₅ | Br | H | H | Eth. |
| C₂H₅ | H | CH₃ | CH₃ | Tri. |
| C₇H₇ | H | H | CH₃ | Tri. |
| C₇H₇ | CH₃ | H | H | Tri. |
| C₇H₇ | Cl | H | CH₃ | Eth. |
| COCH₃ | H | H | H | Eth. |
| COCH₃ | H | H | CH₃ | Tri. |
| COCH₃ | I | H | H | Tri. |
| COC₃H₇ | H | H | H | Eth. |
| COC₃H₇ | H | H | CH₃ | Tri. |
| COC₃H₇ | Cl | H | H | Tri. |

¹ Tri.=trimethylene; Eth.=ethylene.

EXAMPLE XVII 1-methyl-1,4,5,6-tetrahydro-2-[2-(2-methyl-3-hydroxyphenyl)ethyl]pyrimidine hexafluorophosphate A solution of 0.15 moles of N-methyl-1,3-propanediamine in 75 ml. of methanol is treated portionwise with 24.4 g. (0.1 mole) of ethyl 3-(2-methyl-3-hydroxyphenyl)propionimidate hydrochloride. The resulting solution is heated under reflux overnight then allowed to cool. The volatiles are evaporated under reduced pressure, and the residue is taken up in 150 ml. of water. The aqueous phase is stirred under 100 ml. of ether and the ether phase separated. The aqueous phase it treated with 25 ml. of 65% hexafluorophosphoric acid, cooled, and the resulting precipitate isolated.

In like manner the following cyclic amidines are prepared as their hexafluorophosphate salts from the appropriate reactants.

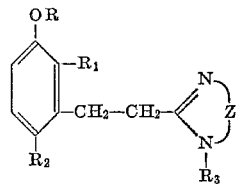

| R | R₁ | R₂ | R₃ | Z |
|---|---|---|---|---|
| H | CH₃ | H | H | Eth. |
| H | Cl | H | H | Eth. |
| H | H | CH₃ | H | Tri. |
| H | H | Cl | CH₃ | Tri. |
| H | H | Cl | H | Tri. |
| H | Br | H | H | Eth. |
| H | H | Br | H | Eth. |
| H | I | H | CH₃ | Tri. |
| H | H | I | CH₃ | Tri. |
| H | H | CH₃ | CH₃ | Eth. |
| H | I | H | H | Eth. |
| H | Br | H | CH₃ | Tri. |
| H | H | Br | CH₃ | Tri. |
| H | H | I | H | Eth. |
| CH₃ | H | H | CH₃ | Tri. |
| CH₃ | CH₃ | H | CH₃ | Tri. |
| C₇H₇ | H | Br | H | Eth. |
| CH₃ | H | Br | H | Eth. |
| C₂H₅ | H | H | H | Tri. |
| C₂H₅ | Cl | H | CH₃ | Eth. |
| C₂H₅ | Br | H | H | Tri. |
| C₇H₇ | H | H | H | Eth. |
| C₇H₇ | CH₃ | H | CH₃ | Tri. |
| C₇H₇ | H | CH₃ | H | Tri. |
| COC₃H₇ | H | H | H | Tri. |
| COCH₃ | H | H | CH₃ | Tri. |
| COCH₃ | H | CH₃ | H | Tri. |
| COCH₃ | Cl | H | H | Tri. |
| COCH₃ | H | Br | H | Tri. |
| COCH₃ | H | H | H | Eth. |

EXAMPLE XVIII

The salts of the products of Examples X–XV and XVII are neutralized to their free bases and the resulting bases and those of Example XVI converted to acid addition salts by treatment with an equimolar proportion of the appropriate acid in methanol as solvent. The salts are recovered by precipitation with a non-solvent, e.g. ether, hexane, or, alternatively, if desired, by evaporation of the solvent. The following salts are thus prepared: p-toluene-sulfonate, pamoate, amsonate, 2-hydroxy-3-naphthoate, stearate, citrate, gluconate, benzoate, acetate, propionate, butyrate, sulfate, nitrate, phosphate, hydrobromide, t-butylacetate, trimethylacetate, oxalate, succinate, malate, tartrate and fumarate.

EXAMPLE XIX

1 - methyl - 1,4,5,6 - tetrahydro -2 - [2-(3-hydroxyphenyl)vinyl]pyrimidine hydrochloride (5.0 g.) is dissolved in water (25 ml.), the solution filtered and added to a well-stirred suspension of Amberlite CG–120 (sodium form of a cation exchange resin) (6.9 g.) in 100 ml. water. The mixture is stirred for 3 hours then filtered, washed with water nad dried in vacuo.

Resin adsorbates of the products of Examples X–XVII can be prepared in like manner.

EXAMPLE XX (A) Tablets and boluses

A convenient tablet size is one containing 250 mg. of the drug. Such tablets can be prepared by thoroughly blending 250 g. of 1-methyl - 1,4,5,6 - tetrahydro-2-[2-(3-hydroxyphenyl)vinyl]pyrimidine hydrochloride or the equivalent weight of other compound within the scope of this invention and 50 g. of starch in a twin shell blender. The blender powders are then mixed with sufficient ethanol to make an easily manipulated paste which is extruded through a 10-mesh screen to provide granules which are dried in vacuo until all the solvent is removed. The granules are coated with magnesium stearate by briefly blending with 2% the total weight of granules of that substance. This mixture is then fed to a tableting press to produce tablets containing 250 mg. of anthelmintic agent in addition to proportionate quantities of the carriers and excipients listed above. For animals, the daily dose varies from 0.01 to 45 g. per day depending again upon the body weight of the animal. Boluses of various sizes can be prepared in the same fashion by simply selecting a die of appropriate size.

(B) Capsules

The products of this invention and their acid addition salts can be conveniently encapsulated in hard gelatin capsules. For therapeutic and prophylactic purposes, from about 10 mg. to 1 gram of these agents can be contained in a single capsule. It is convenient to mix the active ingredient with a solid diluent, for instance, calcium phosphate. From about 15 to 50% the weight of drug of tricalcium phosphate is employed. Thus a hard gelatin capsule can be prepared by thoroughly blending two parts by weight of N,N-dimethyl-3-(3-hydroxyphenyl)acryl amidine hydrochloride and calcium phosphate in a twin shell blender. The powder is then subdivided, and loaded into hard gelatin capsules in such a fashion that each capsule contains 250 mg. active ingredient.

EXAMPLE XXI

Mineral mixture

Such a mixture can be conveniently made by mixing 1-methyl-1,4,5,6 - tetrahydro-2-[2-(3-hydroxyphenyl)vinyl] pyrimidine tartrate, equivalent to 1 part by weight of free base, with 19 parts by weight of the usual granular stock of salt (sodium chloride). The mixture is thoroughly blended and fed to the animals in such quantities as to provide the recommended daily dose. Such salt mixtures can also be incorporated into block form but this is not preferred due to lack of control of the dosage size received by the animals.

In like manner mineral mixtures of the other products within the ambit of this invention can be prepared.

EXAMPLE XXII

Feed mixture

Prophylactic use of these products can be properly accomplished by adding the agent to a feed mixture. The usual prophylactic dose is from about 2.5 to 25 g. (calculated as free base) daily for 1000 pound cattle. Assuming such animal consumes 10 lbs. of feed supplement per day, at least 10 lbs. of the chosen agent per ton would be incorporated. Depending upon the feed consumption of the animal and the dosage employed, the proportion of agent in the feed varies from 0.001% up to about 10% on a weight basis.

PREPARATION A 5-hydroxy-σ-tolualdehyde is prepared from 5-acetoxy-σ-toluic acid as follows.

5-acetoxy-α-toluic acid.—A solution of 152 g. (1.0 mole) of 5-hydroxy-σ-toluic acid, 750 ml. of pyridine and 400 ml. acetic anhydride is warmed at 50° C. for 18 hours. The reaction mixture is then poured into 6 liters of 2 N hydrochloric acid, and is stirred thoroughly. The crystalline product is filtered and washed with water. The crude material is recrystallized from benzene to give colorless crystals.

5-acetoxy-σ-toluoyl chloride.—A solution of 5-acetoxy-σ-toluic acid (17.8 g., 0.1 mole) and 50 ml. of thionyl chloride is heated under reflux for 4 hours. The more volatile components of the reaction mixture are evaporated under reduced pressure, and the oily residue distilled under reduced pressure. The fraction boiling 130– 140° C./15 mm. is collected and used without further purification in the preparation of 1-(5-acetoxy-σ-toluoyl)-2-benzenesulfonyl hydrazine.

1-(5-acetoxy-σ-toluoyl)-2-benzenesulfonyl hydrazine.— A solution of 86 gm. (0.5 mole) of benzenesulfonyl hydrazide in 500 ml. of pyridine at room temperature is treated drop-wise with 170 g. (0.5 mole) of 5-acetoxy-σ-toluoyl chloride. After the addition is complete, the excess pyridine is evaporated under reduced pressure, and the residue is poured into water. The mixture slowly crystallizes and is filtered when crystallization is complete. The crude product is used directly to form 5-hydroxy-σ-tolualdehyde.

5-hydroxy-σ-tolualdehyde.—A solution of 34.4 g. (0.1 mole) of 1-(5-acetoxy-σ-toluoyl)-2-benzenesulfonyl hydrazine, and 170 ml. of ethylene glycol is heated at 160° C., and 35 g. of anhydrous sodium carbonate is added. A few minutes after the nitrogen evolution ceases, the mixture is poured into 1 liter of hot water. Upon cooling to room temperature the aqueous mixture is saturated with potassium carbonate, and is extracted with ether. The extract is dried over anhydrous sodium sulfate, filtered, and evaporated to furnish a crude crystalline residue of 5-hydroxy-σ-tolualdehyde. Recrystallization affords colorless crystals of the pure material.

3-hydroxy-σ-tolualdehyde.—In the same manner 3-acetoxy-σ-toluic acid is converted to 3-hydroxy-σ-tolualdehyde.

PREPARATION B

Formation of ethers—(R=methyl)

The methyl ethers of the 3-hydroxybenzaldehyde reactants are prepared by the procedure of Hodgson and Beard, J. Chem. Soc., page 878 (1925) which comprises dissolving the desired 3-hydroxybenzaldehyde compound in boiling 10% sodium hydroxide solution (1:2 molar proportion), then treating the solution with methyl sulfate (1:3 moles/mole of 3-hydroxybenzaldehyde). The ethers are recovered by steam distillation.

The benzyl and ethyl ethers are produced by the procedure of Pscharr et al., Ber. 33, 1826 by refluxing a solution of the 3-hydroxybenzaldehyde compound on 1 N potassium hydroxide with a small excess (10%) of benzyl or ethyl iodide for one hour. The products are recovered by extraction with ether, removes unreacted reactants by washing the ether solution with dilute potassium hydroxide solution and water and isolates the product by distillation in vacuo.

PREPARATION C

Formation of acyl derivatives (R=lower alkanoyl)

The acyl derivatives of the starting 3-hydroxybenzaldehyde compounds are prepared by the procedure of Tiemann et al., Ber. 15, 2047 which comprises reacting the potassium salt of the 3-hydroxybenzaldehyde compound at ambient temperature with the appropriate lower alkanoic acid anhydride, e.g. acetic, propionic and butyric anhydrides, in anhydrous ether. Upon completion of the reaction (about 24 hours), the precipitated potassium lower alkanoate is filtered off and the ether solution evaporated to dryness. The products are purified by vacuum distillation.

The formyl derivatives are produced by the action of acetoformic acid reagent upon the proper 3-hydroxybenzaldehyde compound at a temperature of from about —30° C. to +50° C. The preferred temperature range is from 0° to 10° C. at which range from about 5 to about 15 molar proportions of acetoformic acid reagent is used per mole of 3-hydroxybenzaldehyde. Reaction-inert diluents such as dioxane, toluene, benzene, dimethyl formamide, ethyl acetate, acetone, pyridine, etc. can be used if desired. The products are recovered by evaporation of the excess acetoformic acid reagent, and diluent when used, under reduced pressure. Alternatively, the product is precipitated with a non-solvent and recovered by filtration, centrifugation or solvent extraction.

What is claimed is:

1. A compound having the formula

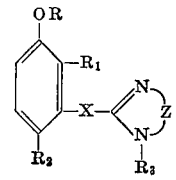

and the non-toxic acid addition salts thereof wherein R is selected from the group consisting of hydrogen, methyl, ethyl, benzyl and lower alkanoyl; each of $R_1$ and $R_2$ is selected from the group consisting of hydrogen, methyl, chloro, bromo and iodo, with the proviso that at least one of $R_1$ and $R_2$ is hydrogen; Z is selected from the group consisting of ethylene and trimethylene; $R_3$ is selected from the group consisting of hydrogen and methyl and X is transvinylene.

2. The hydrochloride salt of the compound of claim 1 wherein R, $R_1$ and $R_2$ are hydrogen, X is transvinylene, $R_3$ is methyl and Z is trimethylene.

3. The pamoate salt of the compound of claim 1 wherein R, $R_1$ and $R_2$ are hydrogen, Z is trimethylene, X is transvinylene and $R_3$ is hydrogen.

4. The tartrate salt of the compound of claim 1 wherein $R_1$ and $R_3$ are methyl, $R_2$ is hydrogen, R is acetyl, X is transvinylene and Z is trimethylene.

References Cited

FOREIGN PATENTS

| | | | |
|---|---|---|---|
| 608,295 | 9/1948 | Great Britain | 260—309.6 |
| 681,413 | 11/1966 | Belgium | 260—240 |

OTHER REFERENCES

Netherlands Published Application No. 6,508,754, pp. 1, 15, 17 and 20 to 21 relied upon.

JOHN D. RANDOLPH, Primary Examiner

U.S. Cl. X.R.

99—2; 424—251, 273, 326; 260—251, 309.6, 453, 465, 469, 470, 473, 508, 564, 600

UNITED STATES PATENT OFFICE
CERTIFICATE OF CORRECTION

Patent No. 3,579,510  Dated May 18, 1971

Inventor(s) James W. McFarland

It is certified that error appears in the above-identified patent and that said Letters Patent are hereby corrected as shown below:

Column 9, line 2, "acrylamidate'" should read -- acrylimidate --.

Column 14, line 28, "$C_3H_5$" should read -- $C_2H_5$ --.

Column 14, line 30, "$C_3H_5$" should read -- $C_2H_5$ --.

Column 14, line 66, "$CH_7$" should read -- $C_7H_7$ --.

Column 14, line 68, "$C_{72}H_5$" should read -- $C_2H_5$ --.

Column 18, line 35, "ether, removes" should read -- ether. One removes --.

Signed and sealed this 2nd day of November 1971.

(SEAL)
Attest:

EDWARD M. FLETCHER, JR.
Attesting Officer

ROBERT GOTTSCHALK
Acting Commissioner of Patents